United States Patent
Fujioka et al.

(10) Patent No.: US 6,845,447 B1
(45) Date of Patent: Jan. 18, 2005

(54) ELECTRONIC VOTING METHOD AND SYSTEM AND RECORDING MEDIUM HAVING RECORDED THEREON A PROGRAM FOR IMPLEMENTING THE METHOD

(75) Inventors: Atsushi Fujioka, Yokohama (JP); Masayuki Abe, Yokohama (JP); Fumiaki Miura, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/434,440

(22) Filed: Nov. 5, 1999

(30) Foreign Application Priority Data

Nov. 11, 1998 (JP) .......................................... 10/320173

(51) Int. Cl.$^7$ .............................. G06F 17/60; H04L 9/00
(52) U.S. Cl. ......................................... 713/156; 705/12
(58) Field of Search ............................. 713/156; 705/12

(56) References Cited

FOREIGN PATENT DOCUMENTS

| JP | 0619943 | 1/1994 |
| JP | 10074046 | 3/1998 |

OTHER PUBLICATIONS

Atsushi Fujioka, A Practical Secret Voting Scheme for Large Scale Elections, 1993, Advances in Cryptography, pp. 244–251.*

Mark Herschberg, Secure Electronic Voting Over the World Wide Web, May 27, 1997, MIT, pp. 22–25.*

Hiroshi Kamikaseda, et al., "Notes on Electronic Election" Department of Information Science and Design, Kyoto Institute Technology, 1993.

Yvo Desmedt, et al., "Threshold Cryptosystems" EE & CS Department, University of Wisconsin–Milwaukee, Milwaukee WI.

* cited by examiner

*Primary Examiner*—Justin T. Darrow
*Assistant Examiner*—Benjamin E. Lanier
(74) *Attorney, Agent, or Firm*—Connolly Bove Lodge & Hutz LLP

(57) ABSTRACT

A voter $V_i$ encrypts his vote content $v_i$ with a public key $k_{PC}$ of a counter C, then concatenates the encrypted vote content $x_i$ with a tag $t_i$ to obtain a ballot $z_i$, then randomizes it with a random number $r_i$ to create a preprocessed text $e_i$, and sends it and a signature $s_i$ therefor to an election administrator A. The administrator A generates a blind signature $d_i$ for the preprocessed text $e_i$ and sends it back to the voter $V_i$. The voter $V_i$ excludes the influence of the random number $r_i$ from the blind signature $d_i$ to obtain administrator signature $y_i$, and sends vote data $<z_i, y_i>$ to a counter C. The counter C verifies the validity of the administrator signature $y_i$ and, if valid, generates and publishes a vote list containing the data $<z_i, y_i>$ to the voter $V_i$. The voter $V_i$ checks the vote list to make sure that it contains the data $<z_i, y_i>$ with his tag $t_i$ held in the ballot $z_i$. The counter C decrypts the encrypted vote content $x_i$ in the ballot $z_i$ to obtain the vote content $v_i$, and counts the number of votes polled for each candidate.

22 Claims, 7 Drawing Sheets

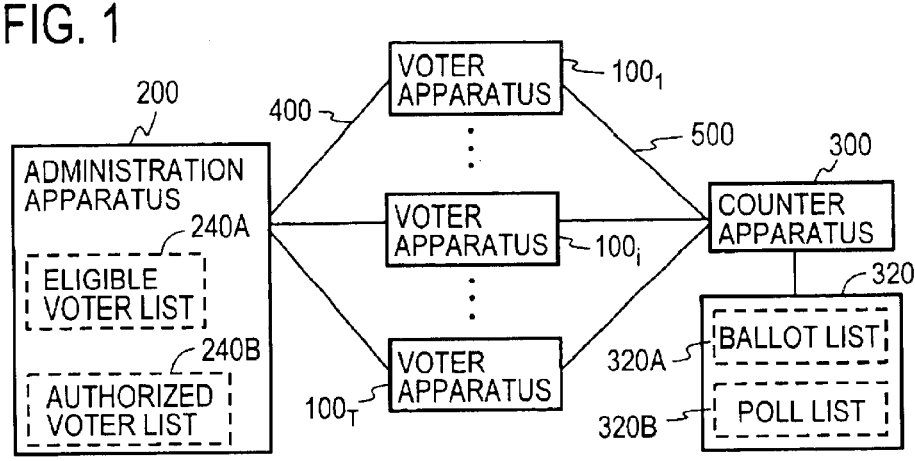

ELECTRONIC VOTING METHOD AND SYSTEM AND RECORDING MEDIUM HAVING RECORDED THEREON A PROGRAM FOR IMPLEMENTING THE METHOD

BACKGROUND OF THE INVENTION

The present invention relates to an electronic voting system and method for implementing secure secret voting in elections, questionnaire surveys or the like which are conducted through a telecommunication system. The invention also pertains to a recording medium having recorded thereon a program for implementing the electronic voting method.

What is intended to mean by the word "voting" herein is a procedure in which voters each choose a predetermined number (one or more) of candidates from those offered to them and a counter counts the number of votes cast for each candidate. The candidates mentioned herein may be not only the names of candidates in elections but also items or headings of choice in statistic surveys. And the content of the vote is identification information representing the candidate chosen by the voter, such as a symbol, name, or heading.

Since the secrete voting scheme provides security for the correspondence between the voters and the contents of their votes and lends itself to protecting the privacy of individuals for their thought and belief, the scheme can be used, for instance, in teleconferencing and questionnaire surveys by CATV or similar two-way communication.

To implement secure secret voting by telecommunication, it is necessary to prevent the impersonation of voters, double voting and a leakage of the content of the vote by wiretapping its message or text. As a solution to these problems, there have been proposed electronic voting schemes using the digital signature technique, for example, in Atsushi Fujioka, Tatsuaki Okamoto and Kazuo Ohta, "A practical secret voting scheme for large scale elections," Advances in Cryptology-AUSCRYPT' 92, Lecture Notes in Computer Science 718, Springer-Verlag, Berlin, pp.244–251 (1993) and Japanese Patent Application Laid-Open No. 19943/94 (laid open Nov. 28, 1994) entitled "Electronic Voting Method and Apparatus."

In this conventional method, a voter $V_i$ encrypts the content of his vote (hereinafter referred to as the vote content) $v_i$ by a key $k_i$ into a ciphertext $x_i$, then randomizes it by a random number $r_i$ to create a preprocessed text $e_i$ for getting a blind signature, then attaches his signature $s_i$ to the text $e_i$, and sends the signed text to an election administrator A. The administrator A first verifies the validity of the voter $V_i$ on the basis of the signature $s_i$, then attaches his blind signature $d_i$ to the preprocessed text $e_i$, and sends it back to the voter $V_i$. The voter $V_i$ retrieves a signature $y_i$ of the election administrator A for the ciphertext $x_i$ from the blind signature $d_i$ affixed to the preprocessed text $e_i$, and sends the administrator's signature $y_i$ to a counter C together with the ciphertext $x_i$. The counter C makes sure that the ciphertext $x_i$ bears the administrator's signature $y_i$, and publishes the ciphertext $x_i$ in its entirety. The voter $V_i$ sends the counter C the key $k_i$ used for the encryption of his vote content $v_i$ when his ciphertext $x_i$ is found registered, and if not registered, the voter $V_i$ presents a protest against the counter C. The counter C uses his received key $k_i$ to decode or retrieve the vote content $v_i$ from the ciphertext $x_i$, and counts the number of votes cast for each candidate.

With this method, however, it is necessary for the voter $V_i$ to confirm the registration of his cipherteXt $x_i$ by checking a list of ballots that is published after completion of the voting of all voters and to send the key $k_i$ to the counter C. Hence, the conventional system lacks usability from a voter's point of view.

The followings are pertinent references, but do not solve the above stated problems: Japanese Patent Application Laid Open Nos. 6-223250 (Aug. 12, 1994), 6-176228 (Jun. 24, 1994), 7-28915 (Jan. 31, 1995), 10-74182 (Mar. 17, 1998), 10-283420 (Oct. 23, 1998) 1-177164 (Jul. 13, 1989), and 10-74046 (Mar. 17, 1998). D. Chaum, "Elections with Unconditionally-Secret Ballots and Disruption Equivalent to Breaking RSA", in Advances in Cryptology, EUROCRYPT '88, Lecture Notes in Computer Science 330, Springer-Verlag, Berlin, pp. 177–182 (1988), L. F. Cranor et al., "Design and Implementation of a Practical Security-Conscious Electronic Polling System", WUCS-96-02, Department of Computer Science, Washington University, St. Louis (January, 1996), M. A. Herschberg, "Secure Electronic Voting Over the World Wide Web", Masters Thesis in Electrical Engineering and Computer Science, Massachusetts Institute of Technology (1997).

SUMMARY OF THE INVENTION

It is therefore an object of the present invention to provide a simple and convenient electronic voting system and method which ensure voter privacy in making a complaint about a possible fraud by the administrator, have robustness against system dysfunction and obviate the necessity for voters to send their encryption keys to the counter after voting.

Another object of the present invention is to provide a recording medium on which there is recorded a program for implementing the above electronic voting method.

In the present invention, each voter encrypts his vote content by a public key of the counter, then randomizes the encrypted vote content by a random number to create a preprocessed text, then attaches thereto his signature, and sends the signed text to the election administrator. The election administrator verifies the validity of the voter through utilization of his signature attached to the encrypted text, then attaches a blind signature to the preprocessed text, and sends back the signed preprocessed text to the voter. The voter excludes the influence of the random number from the blind signature attached to the preprocessed text to obtain administrator's signature information about the encrypted vote content, and sends the signature information as vote data to the counter together with the encrypted vote content. The counter publishes the vote data after making sure that the signature information on the encrypted vote content received from the voter bears the administrator's signature. After every voter confirms the registration of his encrypted vote content in the published list of vote data, the counter decrypts the encrypted vote content by a secret key of his own and counts the number of votes cast for each candidate. If his encrypted vote content is not registered in the list of vote content, the voter complains about it to the counter. It is also possible to provide a system configuration wherein a plurality of counters each hold part of a decryption key and all or a certain number of them collaborate to decrypt all the encrypted vote contents.

According to the present invention, the randomization of the vote content with the random number gives no chance for either of the election administrator and the counter to view the vote content, and hence it guarantees the secrecy of voting.

The decryption key is in the possession of the counter, and the voter needs not to communicate with the counter again for vote counting.

With the system configuration wherein the plurality of counters work together to decrypt the encrypted vote content, the validity of the voter can be proved simply by sending the encrypted vote and the administrator's signature. That is, even if one or more of the counters commit fraud, the vote content will not be revealed unless all the counters or a certain number of them conspire.

Furthermore, since encrypted vote contents are sent to each of the distributed counters, the intermediate results of the vote count will not be revealed, either, without a conspiracy by all or a certain number of counters—this provides increased fairness in the voting system.

Besides, in the system wherein the encrypted vote contents can by decrypted by only a certain number of counters, even if some of the counters are dishonest or impossible to collaborate in decryption, it is possible to decrypt the vote contents; hence, the system is highly fault tolerant.

BRIEF DESCRIPTION OF THE DRAWINGS

FIG. 1 is a block diagram illustrating the general configuration of a voting system according to a first embodiment of the present invention;

FIG. 2A is a table depicting a list of eligible voters;

FIG. 2B is a table depicting a list of voters given the right to vote;

FIG. 2C is a table depicting a list of ballots as received;

FIG. 2D is a table depicting a list of ballots as counted;

FIG. 2E is a table depicting a list of votes polled for each candidate;

DETAILED DESCRIPTION OF THE PREFERRED EMBODIMENTS

While the present invention will hereinafter be described as being applied to the voting in elections, the principles of the invention can also be applied intact to the voting in statistic surveys as referred to previously.

Embodiment 1

Figure 3:
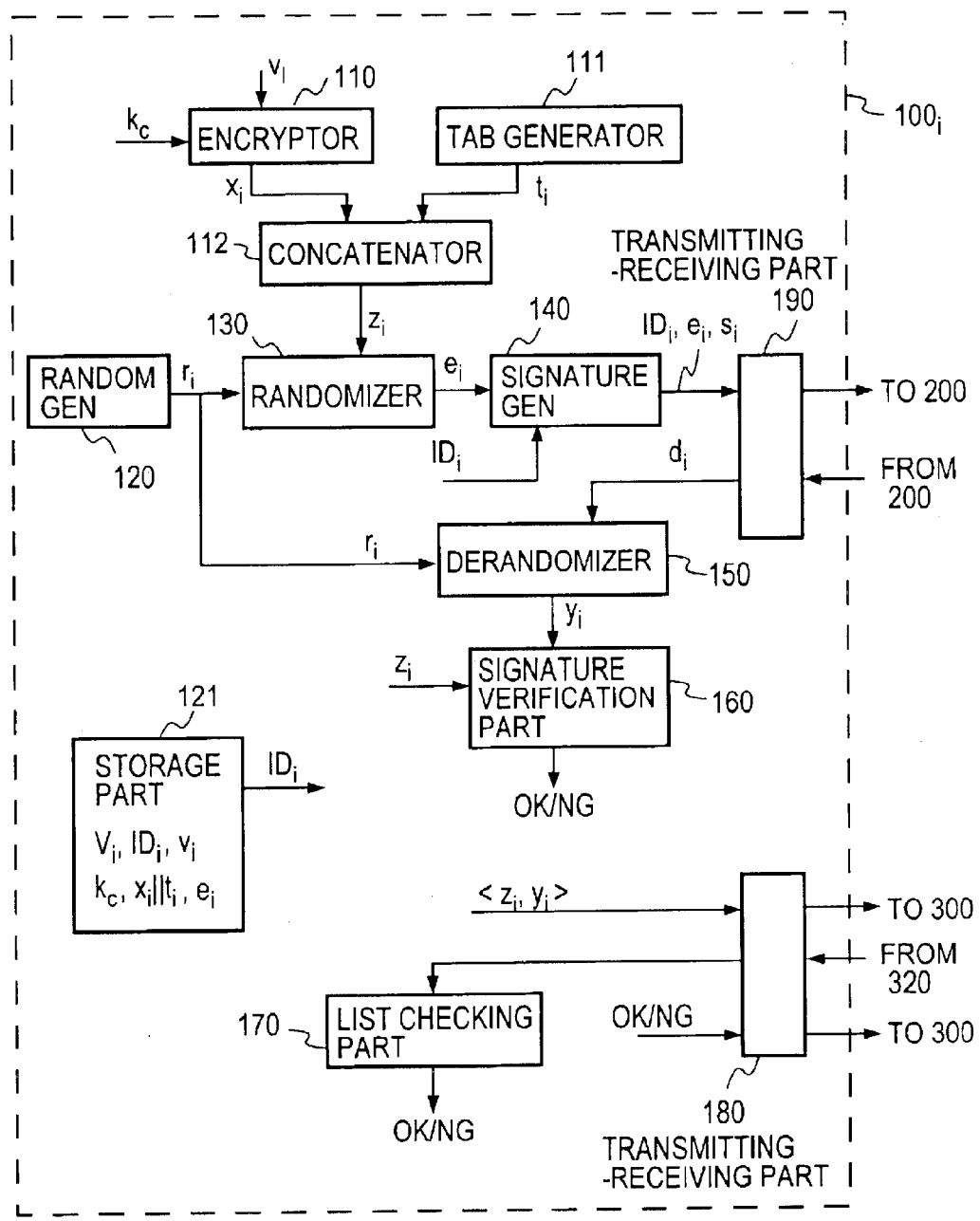
FIG. 3 is a block diagram showing an example of the functional configuration of a voter apparatus 100.

FIG. 1 schematically illustrates the general configuration of the voting system according to the present invention. Apparatuses 100 of T voters $V_i$ (where i=1, . . . , T) (which apparatuses 100 will hereinafter be referred to as voter apparatuses) are each connected to an apparatus 200 of an election administrator A (which apparatus 200 will hereinafter be referred to as an administrator apparatus) and a apparatus 300 of a counter C (which apparatus 300 will hereinafter be referred to as a counter apparatus) via nonanonymous and anonymous communication channels 400 and 500, respectively. When sending information to the administrator A via the nonanonymous communication channel 400, the voter $V_i$ adds the information with sender information indicating who the sender is, for example, his name $V_i$ or identification information $ID_i$. In the case of sending information to the counter C via the anonymous communication channel 500, the voter $V_i$ adds no sender information. The counter C publishes a list of vote contents (a list of votes and a list of the number of votes polled for each candidate), which is accessible from all the voters. FIG. 3 depicts an example of configuration of the voter apparatus 100 in the voting system of FIG. 1, FIG. 4 an example of the configuration of the administrator apparatus 200, FIG. 5 an example of the configuration of the counter apparatus 300, and FIG. 6 an example of a communication sequence in the voting system of the present invention. FIG. 2A exemplifies a list of eligible voters (hereinafter referred to as an eligible-voter list) 240A, FIG. 2B a list of voters authorized to vote (hereinafter referred to as an authorized-voter list) 240B, FIG. 2C a list of ballots as received by the counter C but not yet counted (which list will hereinafter be referred to as a ballot list) 320A, FIG. 2D a list of ballots counted (hereinafter referred to as a counted-ballot list) 320B, and FIG. 2E a list of the numbers of votes polled for individual candidates (hereinafter referred to as a poll list) 320B.

A description will be given of the voting procedure that the voter $V_i$ carries out between he and the counter C after being authorized by the administrator A to vote.

The following is a list of notations that are used in describing the invention below.

$x=\xi_C(v, k_{PC})$: encryption function of the counter C (x: ciphertext, v: vote content, $k_{PC}$: public key of the counter)

$v=\rho_C(x, k_{SC})$: decryption function of the counter C ($k_{SC}$: secret key of the counter)

$s=\sigma_i(e)$: signature generating function of the voter $V_i$ (s: signature, e: encrypted vote content)

$e=\zeta_i(s)$: verification function for the signature of the voter $V_i$ $d=\sigma_A(e)$: a blind signature generating function of the administrator A (d: blind signature)

$z=\zeta_A(y)$: verification function for the signature of the administrator A (y: signature, z: ballot)

$e=\omega_A(z, r)$: randomizing function (r: random number)

$y=\delta_A(d, r)$: derandomizing function (d: blind signature)

The encryption function $\xi_C$ and decryption function $\rho_C$ of the counter C are used in known public key cryptosystems. Now, let it be assumed that the counter C keeps the secret key $k_{SC}$ in secrecy and publishes the public key $k_{PC}$ to the voters. The randomizing function $\omega_A(z, r)$ for the voter $V_i$ to blind the message m by the random number r (to preprocess the ballot for the attachment thereto of the administrator's blind signature) prior to requesting it and the derandomizing function $\delta_A(d, r)$ for removing the random component r from the received blind signature d to extract the signature y of the administrator A attached to the ballot are inevitably determined once the blind signature function $\sigma_A$ of the administrator A is determined. Such signature functions are, for example, an encryption function and a decryption function of the RSA cryptosystem (Ronald Rivest, Adi Shamir and Leonard Adleman, "A method for obtaining digital signatures and public-ky cryptosystems," Communications of the ACM, Vol. 21, No. 2, pp.120–126 (February, 1978)), and the scheme for randomization with a random number as preprocessing for requesting the blind signature is described in detail in David Chaum, "Security without identification: Transaction systems to make big brother obsolete," Communications of the ACM, Vol. 28, No. 10, pp.1030–1044 (October, 1985).

Turning next to FIG. 3, the configuration of the voter apparatus 100 will be described. In a storage part 121 there is prestored identification information $ID_i$ of voters and their names $V_i$. Of the data that is generated in the apparatus 100, data to be used afterward is also stored in the storage part 121. An encryptor 110 encrypts the vote content $v_i$ (the candidate name $CND_h$ in this case) chosen by the voter $V_i$ using the public key $k_{PC}$ of the counter C to obtain the ciphertext $x_i = \xi_C(v_i, k_{PC})$. A tag generator 111 generates a random number $t_i$, which is revealed only to the voter $V_i$ and is used as a tag in such a manner as described below. A concatenator 112 concatenates the ciphertext $x_i$ with the tag $t_i$ and outputs $z_i = x_i \| t_i$. The output $z_i$ will hereinafter be referred to as a ballot. A random generator 120 generates a random number $r_i$. A randomizer 130 randomizes the ballot $z_i$ by the random number $r_i$ based on the randomizing function $e_i = \omega_A(z_i, r_i)$ to generate a preprocessed text $e_i$. A signature generator 140 generates a signature $s_i = \sigma_i(e_i, ID_i)$ that is attached to the preprocessed text $e_i$ to indicate its origin $V_i$. Data $<e_i, s_i, ID_i>$ is sent to the administrator apparatus 200 via the communication channel 400. The voter apparatus 100 is held connected to the administrator apparatus 200 via the communication channel 400 until the former receives a blind signature $d_i$ from the latter.

A derandomizer 150 removes the random component from the blind signature $d_i$ received via a transmitting-receiving part 190 from the administrator apparatus 200 by the random number $r_i$ based on derandomizing function $y_i = \delta_A(d_i, r_i)$, thereby obtaining $y_i$ as the signature of the administrator A for the ballot $z_i$. A signature verification part 160 verifies the validity of the signature $y_i$ by making a check to see if a verification function $z_i = \zeta_A(y_i)$ holds. Data $<z_i, y_i>$ is sent as vote data via a transmitting-receiving part 180 to the counter apparatus 300. A list checking part 170 checks the ballot list 320A received via the transmitting-receiving part 180 from the counter apparatus 300 in response to an access thereto from the voter apparatus 100.

Figure 4:
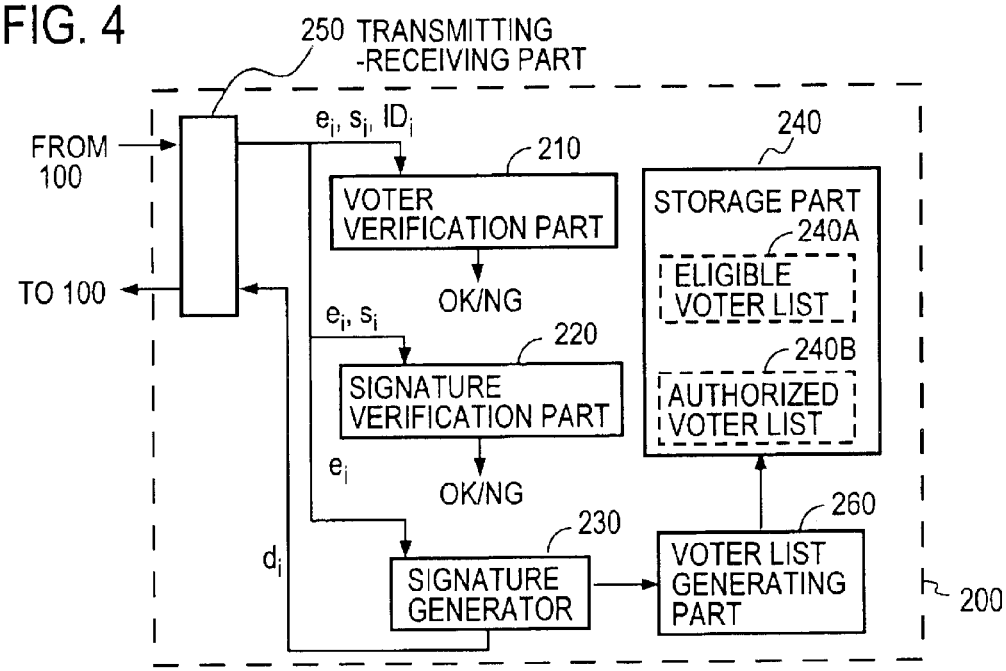
FIG. 4 is a block diagram showing an example of the functional configuration of an election-administrator apparatus 200.

The administrator apparatus 200 depicted in FIG. 4 comprises: a storage part 240 for recording therein the eligible-voter list 240A (FIG. 2A) with the identification information $ID_i$ of eligible voters prestored and the authorized-voter list 240B (FIG. 2B) for storing the identification information $ID_i$ of voters authorized to vote; a voter checking part 210 for making a check to see if the identification information $ID_i$ received from the voter is placed on the eligible-voter list; a signature verification part 220 for verifying the validity of the voter's signature $s_i$ attached to the preprocessed text $e_i$ received from the voter by making a check to see if a verification function $e_i = \zeta_i(s_i)$ holds; a voter list generating part 260 for generating the authorized-voter list 240B (FIG. 2B) by writing data on authorized voters in a predetermined area of the storage part 240; a transmitting-receiving part 250 for data exchange with each voter apparatus $100_i$; and a signature generator 230 for generating a blind signature $d_i = \sigma_A(e_i)$ to be attached to the preprocessed text $e_i$.

Figure 5:
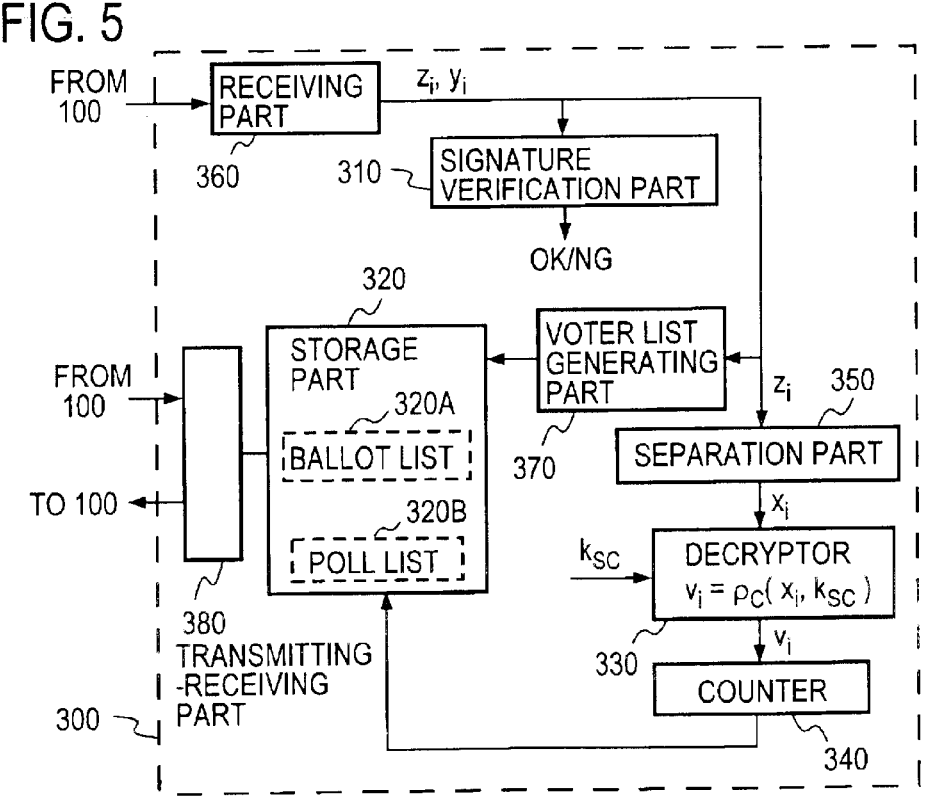
FIG. 5 is a block diagram showing an example of the functional configuration of a counter apparatus 300.

As shown in FIG. 5, the counter apparatus 300 comprises: a signature verification part 310 for verifying the validity of the signature $y_i$ of the administrator A by making a check to see if $z_i = \zeta_A(y_i)$ holds for the ballot $z_i$ and the administrator signature $y_i$ in the vote data $<z_i, y_i>$ received via a receiving part 360 from the voter apparatus 100, through the use of a verification function $\zeta_A(y_i)$; a storage part 320 which gives a serial number $q_i$ to the vote data $<z_i, y_i>$ and places and stores it on the list of ballots (hereinafter referred to as a ballot list) 230A (FIG. 2C); a separation part 350 for separating the ciphertext $x_i$ from the ballot $z_i = x_i \| t_i$; a decryptor 330 for decrypting the ciphertext $x_i$ by the counter's secret key $k_{sc}$ based on the decryption function $\rho_C$ to obtain $v_i = \rho_C(x_i, k_{SC})$ as the vote content; and a counter 340 for counting the vote content $v_i$. Further, the vote data corresponding to the serial number q of the ballot list 320A held in the storage part 320 is added with the decrypted vote content $v_i$ as depicted in FIG. 2D. The results of the vote count, that is, the numbers of votes polled for each candidate ($CND_h$, where h=1, 2, ... ), are stored as the poll list 320B of FIG. 2E in the storage part 320. The contents of the ballot list 320A and the counted-ballot list 320B are sent via a transmitting-receiving part 380 to the voter apparatus 100 that has accessed the counter apparatus 300.

Figure 6:
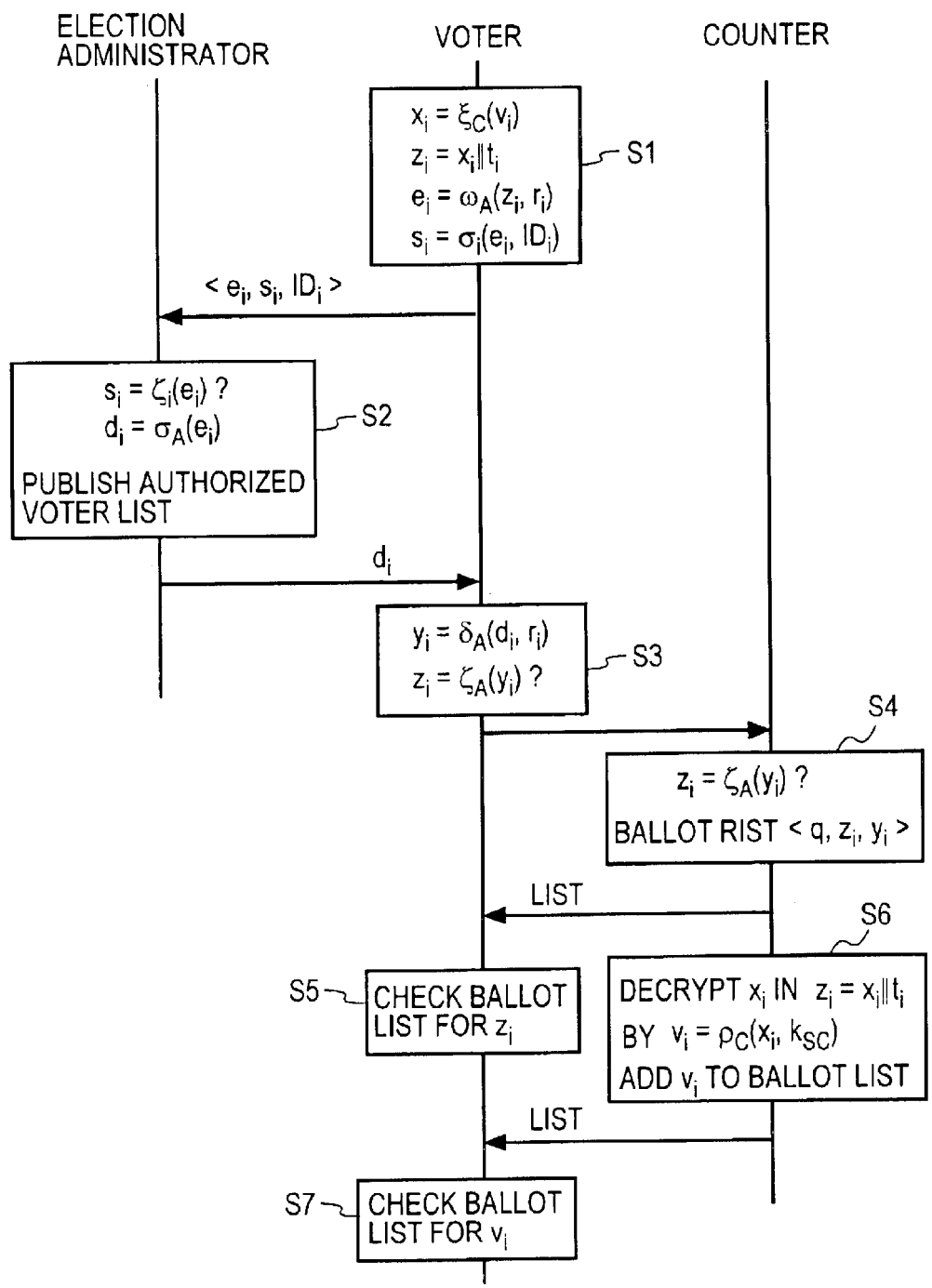
FIG. 6 is a diagram depicting a voting procedure.

Turning next to FIG. 6, the voting procedure in the first embodiment will be described.

Step 1: The voter $V_i$ makes preparations for voting by the voter apparatus 100 (FIG. 3) as described below.

Step 1-1: The voter $V_i$ encrypts the vote content $v_i$ by the encryptor 110 using the public key $k_{PC}$ of the counter C and the encryption function $\xi_C$ to generate the ciphertext $$X_i = \xi_C(v_i, k_{PC}).$$

Then, the voter $V_i$ generates the tag $t_i$ by the tag generator 111 and concatenates it with the ciphertext $x_i$ by the concatenator 112 to obtain the ballot $$z_i = x_i \| t_i.$$

The tag $t_i$ is, for instance, a random number and only the voter $V_i$ knows that it is his own tag.

Step 1-2: The voter $V_i$ generates the random number $r_i$ by the random generator 120, and randomizes the ballot $z_i$ by the randomizer 130 using the random number $r_i$ to create the preprocessed text $$e_i = \omega_A(z_i, r_i).$$

Step 1-3: The voter $V_i$ generates, by the signature generator 140, the signature $s_i$ for the preprocessed text $e_i$ and the identification information $ID_i$:

$$s_i = \sigma_i(e_i, ID_i).$$

After this, the voter $V_i$ sends the data $<e_i, s_i, ID_i>$ to the administrator apparatus 200.

Step 2: The administrator apparatus 200 (FIG. 4) has prestored therein the relationship between the registered eligible voters' names $V_i$ and their identification information $ID_i$ as the eligible-voter list 240A (FIG. 2A), and has the authorized-voter list 240B (FIG. 2B) in which the names $V_i$ or identification information $ID_i$ of the voters authorized to vote are written by the voter list generating part 260. Since the authorized-voter list is published after the voting of all voters, the names $V_i$ or identification information $ID_i$ of the authorized voters are recorded, depending on whether they agree or disagree to reveal their names to the public. This is predetermined prior to the start of the actual voting. The following description will be given on the assumption that the identification information $ID_i$ of the voters $V_i$ is written in the authorized-voter list 240 B (FIG. 2B). At the start of the voting procedure there is nothing recorded in the voter list. The administrator A performs by his apparatus 200 the following procedure to give the eligible voters the right to vote.

Step 2-1: The administrator A makes sure that the voter is eligible, by making a check in the voter checking part 210 to see if his identification information $ID_i$ is contained in the eligible-voter list 240A (FIG. 2A). If not, the administrator A rejects the authorization of the voter $V_i$.

Step 2-2: The administrator A ascertains whether the voter $V_i$ has been authorized to vote, by making a check in the voter checking part 210 to see if his identification information $ID_i$ has already been written in the authorized-voter list 240B (FIG. 2B). If the identification information $ID_i$ is found in the authorized-voter list 240B, the administrator A regards the voting by the voter $V_i$ as double voting and rejects the authorization.

Step 2-3: If the identification information $ID_i$ is not found in the authorized-voter list 240B, then the administrator A makes a check to determine in the signature verification part 220 whether $s_i$, $e_i$ and $ID_i$ satisfy the following equation:

$$(e_i, ID_i) = \zeta_i(s_i).$$

If so, the administrator A provides $e_i$ to the signature generator 230 to calculate the signature $d_i$:

$$d_i = \sigma_A(e_i).$$

Then the administrator A sends the signature $d_i$ via the transmitting-receiving part 250 to the voter apparatus 100 and, at the same time, adds the identification information $ID_i$ of the voter $V_i$ by the voter list generating part 260 to the authorized-voter list 240B (FIG. 2B) in the storage part 240.

Step 2-4: After all voters vote, the administrator A publishes the authorized-voter list 240B and the number of voters who actually voted. For this publication, the administrator A preinforms all the eligible voters that they are allowed to access the authorized-voter list 240B in the storage part 240 of the administrator apparatus 200 via an arbitrary communication channel within a certain period beginning on a predetermined date and time. The access to the authorized-voter list 240B can be made, for example, using a predetermined telephone number. The list 240B may also be published at a predetermined address on the Internet.

Step 3: The voter $V_i$ generates the ballot and its signature information by the voter apparatus 100 (FIG. 1) as described below.

Step 3-1: The voter $V_i$ inputs $d_i$ and $r_i$ into the derandomizer 150 to obtain the following signature information $y_i$ on the ballot $z_i$:

$$y_i = \delta_A(d_i, r_i).$$

Step 3-2: The voter $V_i$ makes sure that $y_i$ is the signature of the administrator A, by making a check in the signature verification part 160 to see if the following equation holds:

$$z_i = \zeta_A(y_i).$$

If not, the voter $V_i$ points out fraud by the administrator A, presenting the data $<e_i, d_i>$.

Step 3-3: If it is verified that the signature is valid, the voter $V_i$ sends data $<z_i, y_i>$ via the transmitting part 180 to the counter apparatus 300 over the anonymous communication channel 500.

Step 4: The counter C collects ballots by the counter apparatus 300 (FIG. 5) as described below.

Step 4-1: The counter C receives the vote data $<z_i, y_i>$ from the voter via the receiving part 360, and makes sure that $y_i$ is a valid signature on the ballot $z_i$, by making a check in the signature verification part 310 to see if the following equation holds:

$$z_i = \zeta_A(y_i).$$

If the equation holds, the counter C gives the ballot $z_i$ and its signature $y_i$ a serial number common q thereto and places them as vote data $<q, z_i, y_i>$ on the ballot list 230A (FIG. 2C) by a vote list generating part 370.

Step 4-2: After all voters vote, the counter C publishes the ballot list 320A by allowing an access to the storage part 320 via the transmitting-receiving part 380. This list is supposed to be accessible from all the voters. As is the case with the authorized-voter list 240B, the counter C preannounces the period and place for publishing the ballot list 320A.

Step 5: The voter $V_i$ conducts the following verification by the voter apparatus 100.

Step 5-1: The voter $V_i$ accesses the storage part 320 of the counter apparatus 300 via the transmitting-receiving part 180, then receives the contents of the ballot list 320A, and makes a check in the list checking part 170 to see if the number of ballots placed on the ballot list 320A is equal to the number of voters published in step 2-4. If not, the voter $V_i$ publishes the serial number q and the random number $r_i$ to point out fraud by the administrator A.

Step 5-2: The voter $V_i$ makes a check in the list checking part 170 to see if his ballot $z_i$ is contained in the ballot list 320A. This can be done by verifying whether the ballot $z_i$ itself is contained in the list 320A, or whether the tag $t_i$ in $z_i = x_i \| t_i$ is his tag. If the ballot $z_i$ is not found on the list 600, then the voter $V_i$ points out fraud of the counter C, presenting the vote data $<z_i, y_i>$.

Step 6: The counter C performs the following vote counting by the counter apparatus 300.

Step 6-1: When no allegation of fraud is received via the receiving part 360 from the voter $V_i$ within a predetermined period of time after the reception of his ballot $z_i$ and signature $y_i$, the counter C separates the ciphertext $x_i$ from the ballot $z_i = x_i \| y_i$ in the separation part 350, and decrypts it by the decryptor 330 using the secret key $k_{SC}$ to detect the vote content $v_i$:

$$v_i = \rho_C(x_i, k_{SC}).$$

Then the counter C verifies whether the vote content $v_i$ is valid or not, that is, whether it correctly represents the name or symbol of any one of the candidates offered in advance. If not so, the vote is regarded as invalid.

Step 6-2: The counter C counts the vote contents $v_i$ in the ballot list 320A of FIG. 2C by means of the counter 340 to obtain the number of votes polled for each candidate, then publishes the results of the vote count as the poll list 320B of FIG. 2E and, at the same time, adds $v_i$ to a q-th piece of data $<x_i, t_i, y_i>$ as depicted in FIG. 2D. The results of the vote count are published together with the ballot list 320A.

Step 7: The voter $V_i$ verifies the validity of the manipulation or management of the counter C by means of the voter apparatus 100. That is, the voter $V_i$ checks whether all vote contents $v_i$ have been contained in the ballot list 320A of FIG. 2C, and whether the ciphertext $x_i$ and the vote content $v_i$ of the voter $V_i$ correspond to each other.

Incidentally, Step 5 may be omitted, and the publication of the poll list 320B in Step 6-2 and Step 7 may also be omitted.

In this embodiment, since the voter $V_i$ encrypts the vote content $v_i$ into $x_i=\xi_C(v_i, k_{PC})$ by the encryption function $\xi_C$ of the counter C and sends him the vote data <$z_i$, $y_i$>, the counter C could view the vote content $v_i$ by decrypting the ciphertext $x_i$ in the ballot $z_i$ with the decryption function $v_i=\rho_C(x_i, k_{SC})$ through the use of the secret key $k_{PC}$ of the counter C even before the publication of the ballot list 320A in step S4-2. In other words, the counter C is in a position to get information such as the trend of voting or intermediate results of the vote count prior to the publication of the ballot list 320B and hence leak the information to a particular person prior to the publication of the official results of the vote count—this is undesirable in terms of the fairness of elections. Besides, according to the first embodiment of the invention, if the counter apparatus 300 suffers a breakdown, the vote count cannot be completed on schedule in some cases. A description will be given below of another embodiment of the present invention which is intended to obviate these problems by the participation of plural distributed counters in the decryption and vote counting processes.

The distributed counters use the same crypto-functions (the encryption function $\xi_C$ and the decryption function $\rho_C$) as in the public-key cryptosystem. However, the decryption process involves the use of a distributed secret key $k_{SCj}$ of every distributed counter, or requires a certain number (a threshold value $U_t$ (where 2<$U_t$<U)) of people to work together. The crypto-functions mentioned above are encryption and decryption functions of, for instance, the ElGamal cryptosystem (Taher ElGamal, "A public key cryptosystem and a signature scheme based on discrete logarithms," IEEE Transactions on Information Theory, Vol. IT-31, No. 4, pp.469–472 (July, 1985)). The scheme of decryption by the distributed counters using such crypto-functions and the scheme using the threshold value are described in detail in Yvo Desmedt and Yale Frankel, "Threshold cryptosystems," in Advances in Cryptology-CRYPTO'89, Lecture Notes in Computer Science 435, Springer-Verlag, Berlin, pp.307–315 (1990).

Embodiment 2

Figure 7:
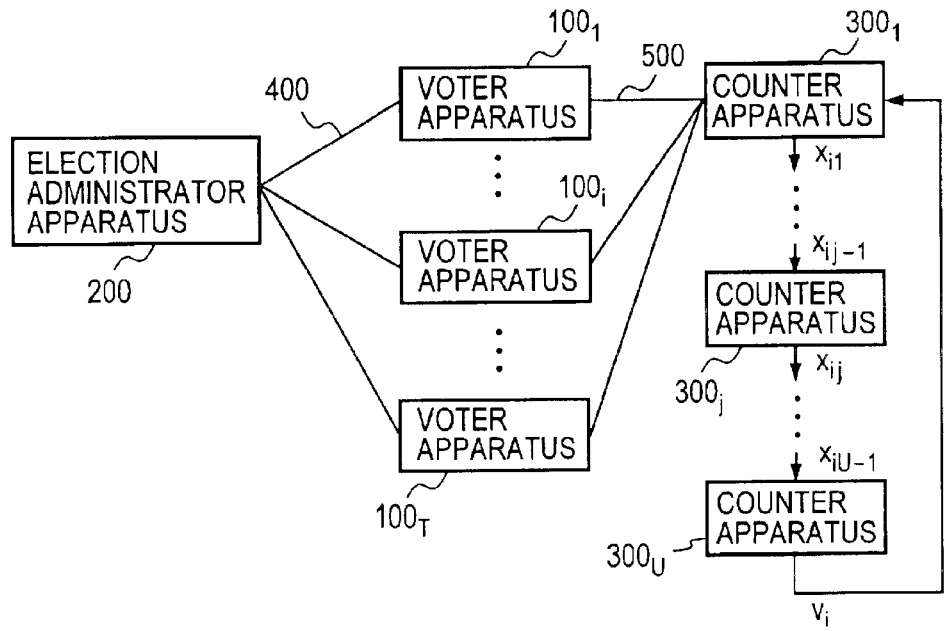
FIG. 7 is a block diagram illustrating the general configuration of a voting system according to a second embodiment of the present invention.

FIG. 7 schematically illustrates the general configuration of a voting system according to a second embodiment of the present invention. This embodiment is identical with the first embodiment in that every voter apparatus 100 is connected to the administrator apparatus 200 through the communication channel 400 and to one counter apparatus through the anonymous communication channel 500, but structurally differs in that a plurality of counter apparatuses (hereinafter referred to as distributed counter apparatuses) 300$_j$ (where j=1, ..., U). The distributed counter apparatus 300$_1$ decrypts ciphertexts $x_i$ from all voters to generate $x_{i1}$ and sends it to the next distributed counter 300$_2$; similarly, a j-th distributed counter apparatus 300$_j$ decrypts decrypted data $x_{ij-1}$ received from the immediately preceding distributed counter apparatus 300$_{j-1}$ to generate decrypted data $x_{ij}$ and sends it to the next distributed counter apparatus 300$_{j+1}$. The vote content $v_i$ is obtained for the first time with the decryption process by the last distributed counter apparatus 300$_U$. As is the case with the first embodiment, the identification information $ID_i$ of the voter $V_i$ is attached to the data that is sent from the voter apparatus 100$_i$ to the administrator 200 via the communication channel, but no identification information $ID_i$ accompany the data that is sent to the distributed counter apparatus 300$_1$ via the anonymous communication channel 500.

This embodiment is identical with the first embodiment in the communication sequence, the configuration of each voter apparatus 100 and the configuration of the administrator apparatus 200 except that the counter apparatus 300 is substituted with a plurality of distributed counter apparatuses. Furthermore, this embodiment is common to the first embodiment in that each voter encrypts the vote content $v_i$ by $x_i=C(v_i, k_{PC})$ through the use of the common public key $k_{PC}$. The counters $C_1$ to $C_U$ each have one of U partial secret keys $k_{SC1}, k_{SC2}, ..., k_{SCU}$ into which the secret key $k_{SC}$ is split, and perform the decryption process using them, respectively, but no distributed counter apparatus 300$j$ can decrypt the vote content $v_i$ from the ciphertext $x_i$ on a stand-alone basis. In the case of employing the aforementioned ElGamal cryptosystem, the partial secret keys $k_{SC1}, k_{SC2}, ..., k_{SCU}$ can be set such that the sum total of their values equals the value of the secret key $k_{SC}$ corresponding to the public key $k_{PC}$. This is described in the aforementioned Desmedt-Frankel literature.

Figure 8A:
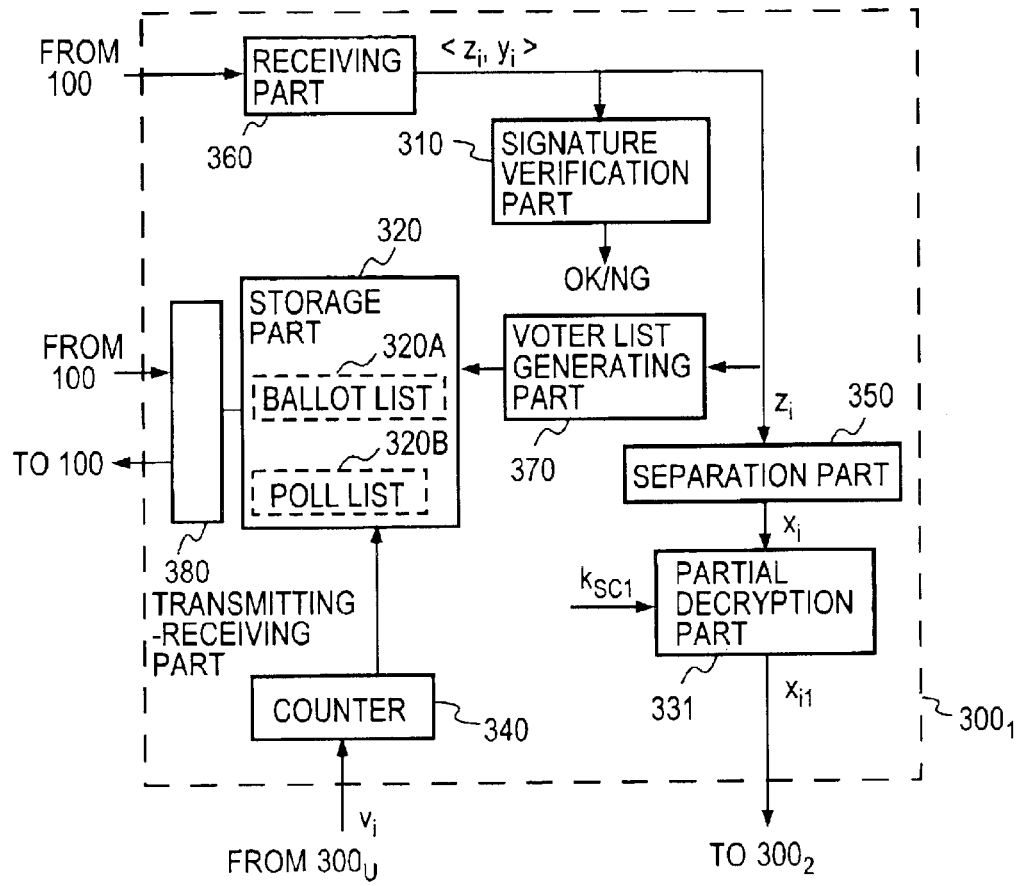
FIG. 8A is a block diagram depicting an example of the functional configuration of a distributed counter apparatus $300_1$ in FIG. 7.
Figure 8B:
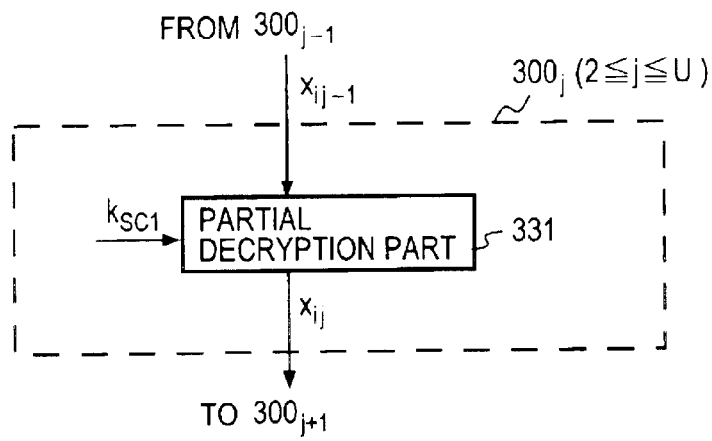
FIG. 8B is a block diagram depicting an example of the functional configuration of each of distributed counter apparatuses $300_2$ through $300_U$ in FIG. 7.

FIG. 8A depicts the configuration of the first distributed counter apparatus 300$_1$ that collects ballots from the voter apparatuses 100$_1$ to 100$_T$. The distributed counter apparatus 300$_1$ comprises a signature verification part 310, a storage part 320, a counter 340, an separation part 340, a partial decryption part 331, a receiving part 360, a vote list generating part 370, and a transmitting-receiving part 380. The first distributed counter apparatus 300$_1$ differs from the counter apparatus 300 in the first embodiment of FIG. 5 in the point described below. First, the partial decryption part 331 generates decrypted intermediate data $x_{i1}$ by performing a description process $x_{i1}=\rho_{C1}(x_i, k_{SC1})$ on the ciphertext $x_i$ through the use of the partial secret key $K_{SC1}$, the decrypted intermediate data $x_{i1}$ being sent to the next distributed counter apparatus 300$_2$. Second, the counter 340 receives the decrypted vote content $v_i$ from the last distributed counter apparatus 300$U$ and counts the votes. The second through U-th distributed counter apparatuses 300$_2$ to 300$_U$ are common in that they have only a partial decryption part 331 as shown in FIG. 8B, in which the j-th distributed counter apparatus (where $2 \leq j \leq U$) is exemplified. The j-th distributed counter apparatus 300$_j$ performs a decryption process $\rho_{Cj}(x_{ij-1}, k_{SCj})$ of decrypted intermediate data $x_{ij-1}$ from the preceding-stage distributed counter apparatus 300$_{j-1}$ to generate decrypted intermediate data $x_{ij}$ and sends it to the next-stage distributed counter apparatus 300$_{j+1}$. The distributed counter apparatus 300$_U$ of the last stage obtains the ultimate decrypted result $x_{iU}$ as the vote content $x_i=x_{iU}$ by a decryption process $x_{iU}=\rho_{CU}(x_{iU-1}, k_{SCU})$, and sends the vote content $v_i$ to the first distributed counter apparatus 300$_1$.

A description will be given of the voting procedure in the second embodiment. This embodiment is common to the first embodiment in the procedure from Steps 1 through 5. However, it is the first distributed counter apparatus 300$_1$ that receives the vote data <$z_i$, $y_i$> from each voter apparatus 100$_i$. The second embodiment modifies Steps 6 and 7 in the first embodiment as described below, and U represents the number of distributed counter apparatuses.

Step 6: The distributed counter $C_j$ (where j=1, ..., U) performs the vote counting process by the distributed counter apparatus 300$_j$ as described below.

Step 6-1: The first distributed counter apparatus 300$_1$ separates $z_i=x_i\|t_i$ in the vote data <$z_i$, $y_i$> from each voter apparatus 100$_i$ (where i=1, ..., T) by the separation part 350 into the ciphertext $x_i$ and the tag $y_i$, and performs the following decryption process in the partial decryption part 330 using the partial secret key $k_{SC1}$ to obtain the decrypted intermediate data $x_{i1}$:

$$x_{i1}=\rho_{C1}(x_i, k_{SC1}).$$

Then the distributed counter apparatus 300$_1$ sends the decrypted intermediate data $x_{i1}$ to the second distributed counter apparatus 300$_2$.

Thereafter, the j-th distributed counter apparatus $300_j$ similarly performs the following decryption process of decrypted intermediate data $x_{ij-1}$ from the (j−1)th distributed counter apparatus $300_{j-1}$ in the partial decryption part 330 using the partial secret key $k_{SCj}$:

$$x_{ij} = \rho_{Sj}(xi, k_{SCj-1}),$$

and sends the data $x_{i1}$ to the next (j+1)th distributed counter apparatus $300_{j+1}$.

The last U-th distributed counter apparatus $300_U$ obtains the vote content $v_i$ by performing the following description process of decrypted intermediate data $x_{iU-1}$ from the (U−1)th distributed counter apparatus $300_{U-1}$ in the partial decryption part 330 using the partial secret key $k_{SCU}$:

$$v_i = x_{iU} = \rho_{CU}(x_i, k_{SCU}).$$

The U-th distributed counter apparatus 300U makes a check to see if the thus obtained vote content $v_i$ is valid.

Step 6-2: The U-th distributed counter $C_U$ counts the vote contents $v_i$ by the counter 340, then publishes the results of the vote count and, at the same time, adds the vote contents $v_i$ to the poll list 320B.

Step 7: The voter $V_i$ verifies the validity of the manipulation or management of the U-th distributed counter apparatus $300_U$ C by means of the voter apparatus $100_i$.

As described above, according to the second embodiment, the plurality of distributed counter apparatuses $300_1$ to $300_U$ sequentially perform the decryption process and the distributed counter apparatus $300_U$ ultimately obtains the vote content $v_i$; hence, no distributed counter is allowed to view the vote content $v_i$ singly prior to the vote counting.

Third Embodiment

Figure 9:
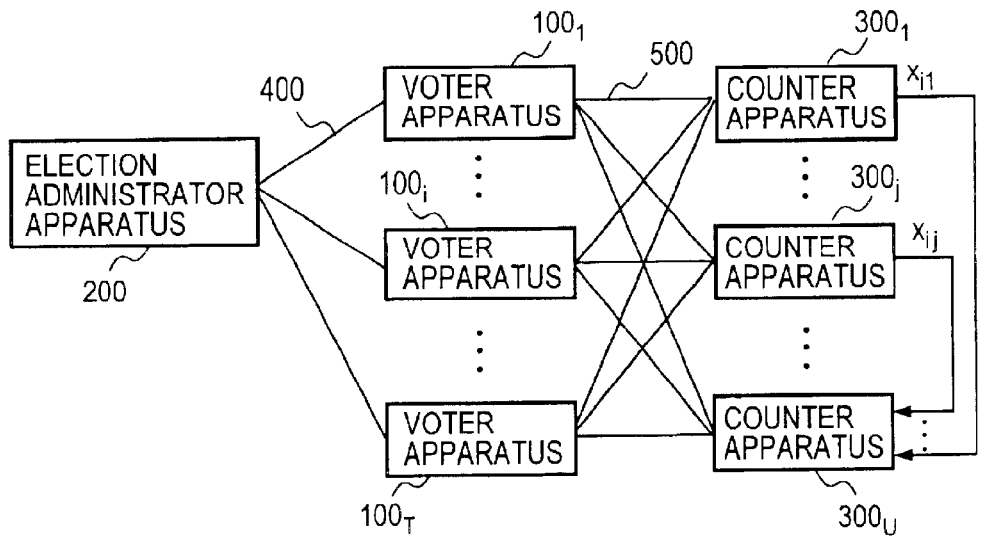
FIG. 9 is a block diagram illustrating the general configuration of a voting system according to a third embodiment of the present invention.

FIG. 9 illustrates the general configuration of a voting system according to a third embodiment of the present invention. In this embodiment each voter apparatus $100_i$ (where i=1, ..., T) is made connectable to all the distributed counter apparatuses $300_1$ to $300_U$ through the communication channels 500, and sends its generated vote data $<z_i, y_i>$ to all of the distributed counter apparatuses $300_1$ to $300_U$. The configurations of each voter apparatus 100i and the administrator apparatus 200 are the same as in the first and second embodiments.

Figure 10A:
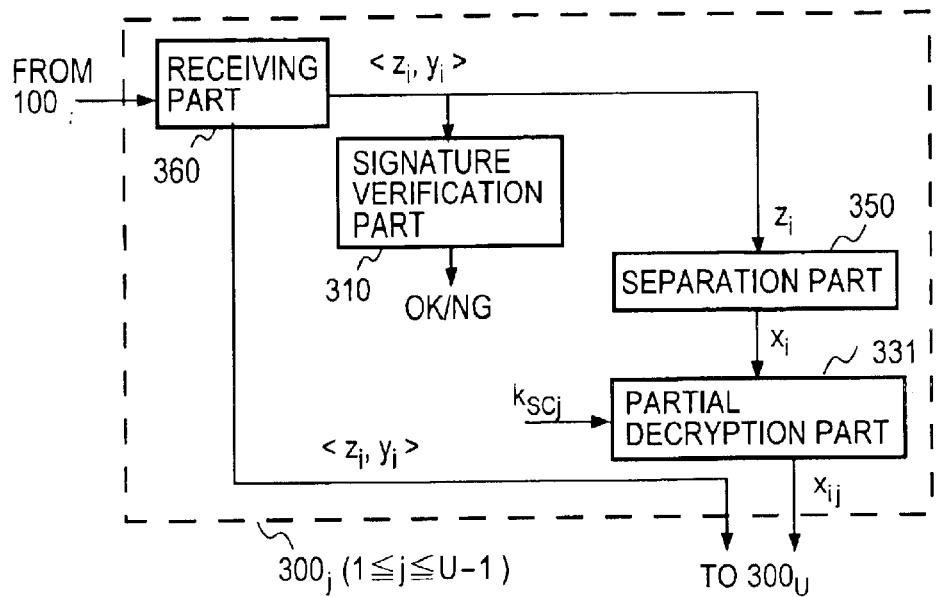
FIG. 10A is a block diagram depicting an example of the functional configuration of each of distributed counter apparatuses $300_1$ through $300_{U-1}$ in FIG. 9.
Figure 10B:
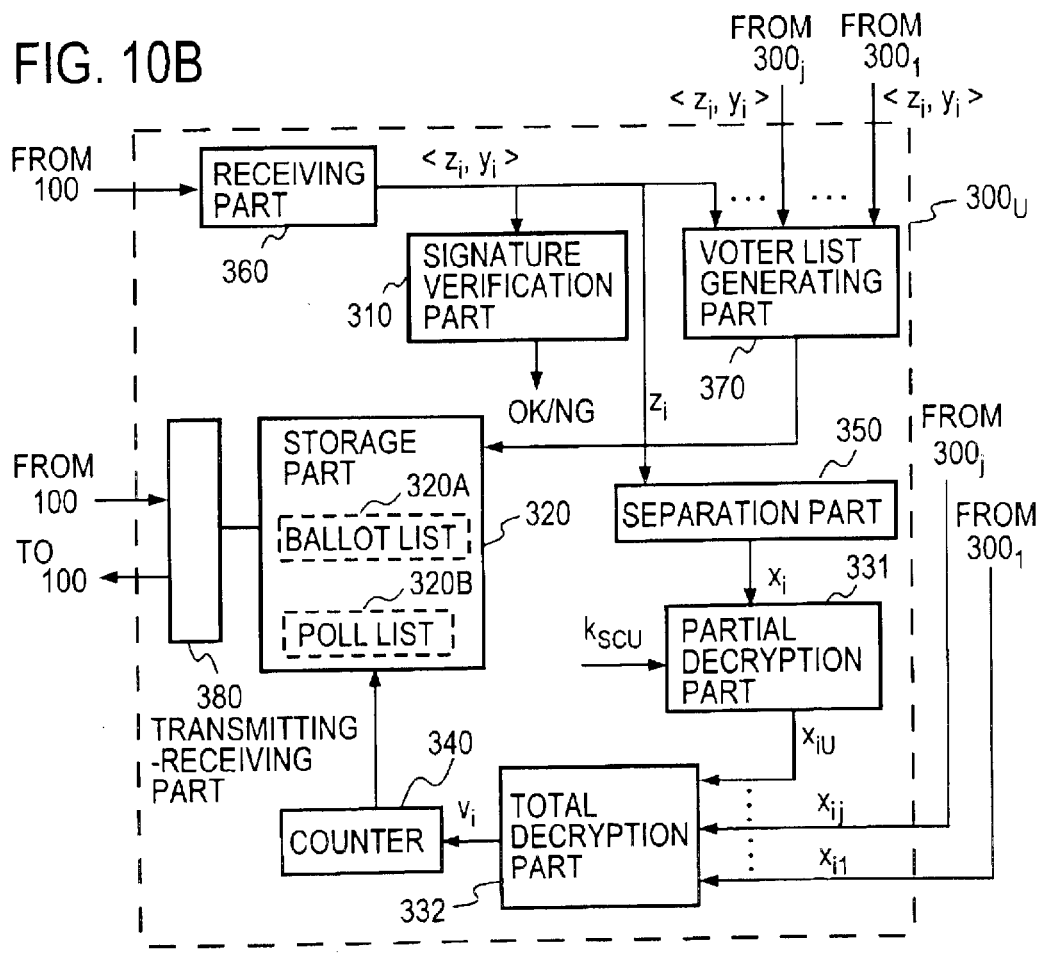
FIG. 10B is a block diagram depicting an example of the functional configuration of a distributed counter apparatus $300_U$ in FIG. 9.

The first to (U−1)th distributed counter apparatuses $300_1$ to $300_{U-1}$ all identical in configuration. FIG. 10A depicts the configuration of the j-th distributed counter apparatus $300_j$, which comprises: a signature verification part 310 for verifying the validity of the signature $y_i$ for the ballot $z_i$ in the vote data $<z_i, y_i>$ received from each voter apparatus $300_i$; a separation part 350 for separating the ciphertext $x_i$ from the ballot $z_i$; and a partial decryption part 331 for performing the description process $x_{ij} = \rho_{Cj}(x_i, k_{SCj})$ of the ciphertext $x_i$ by the partial secret key $k_{SCj}$ to obtain the decrypted intermediate data $x_{ij}$, which is sent to a predetermined one of the distributed counter apparatuses, in this example, $300_U$. As depicted in FIG. 10B, the distributed counter apparatus 300U additionally comprises, in the configuration of FIG. 10A, a storage part 320, a total decryption part 332, a counter 340, a vote list generating part 370 which gives a serial number q to each of the vote data $<z_i, y_i>$ received from all of the distributed counter apparatuses $300_1$, ..., $300_U$ and writes it in the ballot list 320A, and a transmitting-receiving part 380 which allows the voter apparatuses to access the ballot list 320A and the poll list 320B. In the storage part 320 there are made up a ballot vote list 320A on which to place vote data received from the other distributed counters $300_1$ to $300_{U-1}$ and a poll list 320B on which to place the total number of ballots polled for each candidate. The total decryption part 332 performs the decryption process $v_i = \rho_C(x_{i1}, ..., X_{iU})$, using the decryption function $\rho_C$, for the decrypted intermediate data $x_{i1}$ to $x_{iU}$ generated in the respective distributed counter apparatuses $300_1$ to $300_U$ to obtain the vote content $v_1$, and provides it to the counter 340. The counter 340 verifies the validity of the vote content $v_i$ and, if valid, adds 1 to the number of ballots polled for the corresponding candidate in the poll list 320B in the storage part 320. At the same time, the counter 340 adds $v_i$ to the corresponding vote data on the ballot list.

This embodiment also inhibits any of the distributed counter apparatuses from decrypting the vote content $v_i$ from the ciphertext $x_i$ on a stand-alone basis, and hence it ensures fraud-free, fair elections.

Modification 1

In the second and third embodiments the vote content $v_i$ cannot be decrypted from the ciphertext $x_i$ without collaboration of all the distributed counters $C_1$ to $C_U$. This embodiment modifies the above-described decryption process by requiring at least L (where $2 \leq L \leq U-1$) distributed counter apparatuses to work together to decrypt the vote content $v_i$ from the ciphertext $x_i$, using the public key $k_C$. This can be done, for example, by the application of the aforementioned Desmedt-Frankel scheme to the configuration of the partial decryption part 331. This method will be described below as being applied to the second embodiment (FIGS. 7, 8A and 8B).

For example, when any one $300_j$ of the distributed counter apparatuses $300_2$ through $300_U$ suffers a breakdown, the distributed counter apparatus $300_{j-1}$ sends the decrypted intermediate data $x_{ij-1}$ to the distributed counter apparatus $300_{j+1}$, bypassing the failing one $300_j$. The distributed counter apparatus $300_{j+1}$ decrypts the received decrypted intermediate data $x_{ij-1}$ by performing the decryption process $x_{ij+1} = \rho_C(x_i, k_{SCj+1})$ with the partial secret key $k_{SCj+1}$ to obtain the decrypted intermediate data $x_{ij+1}$, and passes it to the next distributed counter apparatus $300_{j+2}$. The method for generating the secret key for use in this case is described, for example, in the aforementioned Desmedt-Frankel literature. Assume that all the distributed counter apparatuses $300_1$ through $300_U$ have the configuration depicted in FIG. 8A. In this instance, even if the first distributed counter apparatus $300_1$ breaks down, the distributed counter apparatus $300_2$ of the next stage substitutes therefor to receive the vote data $<z_i, y_i>$ from the voter apparatuses $100_1$ to $100_T$. The distributed counter apparatus $300_U$ of the final stage sends the decrypted vote content $v_i$ to the distributed counter apparatus $300_2$ that carries out the required operation in behalf of the failing distributed counter apparatus $300_1$. Thus this embodiment enables the vote counting to carried out regardless of which distributed counter apparatus breaks down.

Modification 2

With the application of the Desmedt-Frankel scheme to the partial decryption part 331 and the total decryption part 332, it is also possible, in the third embodiment (FIGS. 9, 10A and 10B), to decrypt the vote content $v_i$ if the decrypted intermediate data by at least L (where $2 \leq L \leq U-1$) distributed counter apparatuses is obtainable. For example, when the distributed counter apparatuses $300_1$ through $300_{U-L}$ break down, decrypted intermediate data $x_{iU-L+1}$ to $x_{iU}$ from the remaining distributed counter apparatuses $300_{U-L+1}$ to $300_U$ are provided to the total decryption part 332 of the distributed counter apparatus $300_U$ for the decryption of the vote content $v_i$ through the decryption process $v_i = \rho_C(x_{iU-L+1}, X_{iU-L+2}, ..., x_{iU})$ of the received pieces of decrypted intermediate data. The counter 340 verifies the validity of the thus decrypted vote content $v_i$ and, if valid, adds 1 to the number of polls voted for the candidate corresponding to $v_i$ on the poll list 320B in the storage part 320.

With the application of the configuration of FIG. 10B to all of the distributed counter apparatuses $300_1$ to $300_U$ in this modification, even if a total of U−L distributed counter apparatuses break down, it is possible to count the votes by causing one of the remaining distributed counter apparatuses to perform the same operation as described previously with reference to FIG. 10B.

FIGS. 3 to 5, 8A, 8B, 10A and 10B depict the functional configurations of the respective apparatuses; their functions each can be implemented into operation by means of a controller, or they can be executed wholly or partly by a computer.

Effect of the Invention

As described above, the present invention encrypts the vote content $v_j$ with the public encryption key $k_{PC}$ of the counter, and hence it obviates the necessity for the voter to send a key to the counter for the decryption of the vote content $v_i$.

With plural counters, the vote counting cannot be started without the consent of them all.

In the case where a fixed number of counters can count the votes, it is possible to perform the vote counting by the collaboration of a certain number of valid or normal counter apparatuses, protecting the vote counting from the influence of fraud or failing apparatus.

Moreover, an alteration of the vote content by the counter could be detected by checking the published list of vote contents. That is, when having found that his vote has not been counted, the voter needs only to point out or allege fraud by publishing the encrypted ballot $x_j$ and the administrator's signature $y_i$. In this instance, when the number of dishonest counters is fixed, the voter privacy is protected.

Besides, according to the present invention, since the vote content is sent after being encrypted with the encryption key, it is possible to prevent a fraud that, at the time of collecting ballots, one of the plural counters leaks the intermediate result of vote count to affect the election.

As will be appreciated from the above, the present invention provides increased convenience to voters through utilization of the counter's encryption key and, by using plural counters, protects against the fraud or leaking the intermediate result of the vote count to affect the election.

It will be apparent that many modifications and variations may be effected without departing from the scope of the novel concepts of the present invention.

What is claimed is:

1. An electronic voting method in which voters obtain authorization to vote from an administrator and send their vote data to a counter apparatus, and said counter apparatus performs vote counting, said counter apparatus has a series connection of a plurality of distributed counter apparatuses, each placed under the control of a different counter; a secret key of said counter apparatus is split into partial secret keys assigned to said plurality of distributed counter apparatuses, respectively, said method comprising the steps wherein:

(a) each of said voters encrypts the vote content corresponding to his chosen candidate by an encryptor with a public key of said counter apparatus, and randomizes information containing said encrypted vote content by a random number to create a preprocessed text, and sends it to an administrator apparatus;

(b) said administrator apparatus verifies the validity of each voter apparatus, and inputs said received preprocessed text into a signature generator to generate a blind signature for said preprocessed text, and sends it back to said each voter apparatus;

(c) said each voter excludes the influence of said random number from said blind signature for said received preprocessed text; and obtains a signature of said administrator for said information containing said encrypted vote content, and sends said administrator signature and said information containing said encrypted vote content, as vote data, to one of said plurality of distributed counter apparatuses which is connected to one end of said series connection; and (d) said plurality of distributed counter apparatuses sequentially decrypt information containing said encrypted vote content in their decryption parts with said partial secret keys to obtain, at the last stage of said series connection, vote content and count at the last stage of said series connection the number of votes polled for the candidate corresponding to said vote content.

2. An electronic voting method in which voters obtain authorization to vote from an administrator and send their vote data to a counter apparatus, and said counter apparatus performs vote counting, said counter apparatus has a plurality of distributed counter apparatuses, each placed under the control of a different counter, a secret key is split into partial secret keys assigned to a plurality of distributed counter apparatuses, respectively, said method comprising the steps wherein:

(a) each of said voters encrypts the vote content corresponding to his chosen candidate by an encryptor with a public key of said counter apparatus, and randomizes information containing said encrypted vote content by a random number to create a preprocessed text, and sends it to an administrator apparatus;

(b) said administrator apparatus verifies the validity of each voter apparatus; and inputs said received preprocessed text into a signature generator to generate a blind signature for said preprocessed text, and sends it back to said each voter apparatus;

(c) said each voter excludes the influence of said random number from said blind signature for said received preprocessed text; and obtains a signature of said administrator for said information containing said encrypted vote content, and sends said administrator signature and said information containing said encrypted vote content, as vote data, to all of said plurality of distributed counter apparatuses; and (d) said plurality of counter apparatuses individually process information containing said encrypted vote content in their decryption parts with said partial secret keys to generate intermediate data, said intermediate data is sent from said distributed counter apparatuses to a predetermined one of them and decrypted into said vote content, and the number of votes polled for the candidate corresponding to said vote content are counted.

3. An electronic voting system which comprises a plurality of voter apparatuses, an administrator apparatus connected to each of said voter apparatuses through a nonanonymous communication channel, and a counter apparatus connected to each of said voter apparatuses through an anonymous communication channel, wherein:

said counter apparatus has a series connection of a plurality of distributed counter apparatuses, each placed under the control of a different counter, a secret key of said counter apparatus is split into partial secret keys assigned to said plurality of distributed counter apparatuses, respectively;

said each voter apparatus comprises:

an encryptor for encrypting a vote content of a voter of said each voter apparatus with a public key of said counter apparatus to generate an encrypted vote content;

a random generator for generating a random number;

a randomizer for randomizing said encrypted vote content with said random number to create a preprocessed text;

means for sending said preprocessed text to said administrator apparatus;

a derandomizer for excluding the influence of said random number from a blind signature of said administrator apparatus, received therefrom, for said preprocessed text to obtain an administrator signature of said administrator apparatus for information containing said encrypted vote content; and means for sending said administrator signature and said information containing said encrypted vote content, as vote data, to one of said plurality of distributed counter apparatuses which is connected to one end of said series connection;

said administrator apparatus comprises:

a blind signature generator for generating said blind signature for said preprocessed text;

means for sending said blind signature to said each voter apparatus; and said distributed counter apparatuses comprise:

decryption parts for sequentially decrypting information containing said encrypted vote content with said partial secret keys, said vote content being obtained by the decryption processing in said distributed counter apparatus at the last stage of said series connection; and a counter provided at the last stage of said series connection, for performing vote counting for each candidate on the basis of said decrypted vote content.

4. An electronic voting system which comprises a plurality of voter apparatuses, an administrator apparatus connected to each of said voter apparatuses through a nonanonymous communication channel, and a counter apparatus connected to each of said voter apparatuses through an anonymous communication channel, wherein:

said counter apparatus has a plurality of distributed counter apparatuses, each placed under the control of a different counter, a secret key of said counter apparatus is split into partial secret keys assigned to said plurality of distributed counter apparatuses, respectively;

said each voter apparatus comprises:

an encryptor for encrypting a vote content of a voter of said each voter apparatus with a public key of said counter apparatus to generate an encrypted vote content;

a random generator for generating a random number, a randomizer for randomizing said encrypted vote content with said random number to create a preprocessed text;

means for sanding said preprocessed text to said administrator apparatus;

a derandomizer for excluding the influence of said random number from a blind signature of said administrator apparatus, received therefrom, for said preprocessed text to obtain an administrator signature of said administrator apparatus for information containing said encrypted vote content;

means for sending said administrator signature and said information containing said encrypted vote content, as vote data, to all of said plurality of distributed counter apparatuses; and said administrator apparatus comprises:

a blind signature generator for generating said blind signature for said preprocessed text;

means for sending said blind signature to said each voter apparatus; and each of said distributed counter apparatuses comprises:

a decryption part for processing said encrypted vote content with said partial secret key assigned thereto to generate intermediate data and for sending said intermediate data to a predetermined one of said distributed counter apparatuses; and a total decryption part provided in said predetermined distributed counter apparatus for decrypting all of said intermediate data to obtain said vote content; and a counter provided in said predetermined distributed counter apparatus for performing vote counting for each candidate on the basis of said decrypted vote content.

5. A counter apparatus in an electronic voting system which comprises a plurality of voter apparatuses, an administrator apparatus connected to each of said voter apparatuses through a nonanonymous communication channel, and said counter apparatus connected to each of said voter apparatuses through an anonymous communication channel, said counter apparatus comprising:

an administrator signature verification part supplied with information containing vote content encrypted by a public key of a counter, received as vote data from said each voter apparatus, and an administrator signature for information containing said encrypted vote content, for verifying the validity of said administrator signature;

a vote list generator for generating a list of said vote data received from said each voter apparatus when said administrator signature is found valid and for publishing said list to a voter of said each voter apparatus in a manner to be accessible therefrom;

a decryptor for decrypting said information containing said encrypted vote content with a secret key corresponding to said public key to obtain the vote content of said voter;

counter means for counting the number of votes polled for each candidate on the basis of said decrypted vote content;

a series connection of a plurality of distributed counter apparatuses, each placed under the control of a different counter, and wherein: said secret key is split into partial secret keys assigned to said plurality of distributed counter apparatuses, respectively; said vote data sent from said each voter apparatus is received by that one of said plurality of distributed counter apparatuses which is connected to one end of said series connection; said distributed counter apparatuses have partial decryption parts for sequentially decrypting information containing said encrypted content with said partial secret keys, and said vote content is obtained by the decryption process of said partial decryption part in said distributed counter apparatus at the last stage of said series connection.

6. A counter apparatus in an electronic voting system which comprises a plurality of voter apparatuses, an administrator apparatus connected to each of said voter apparatuses through a nonanonymous communication channel, and said counter apparatus connected to each of said voter apparatuses through an anonymous communication channel, said counter apparatus comprising:

an administrator signature verification part supplied with information containing vote content encrypted by a public key of a counter, received as vote data from said each voter apparatus, and an administrator signature for information containing said encrypted vote content, for verifying the validity of said administrator signature;

a vote list generator for generating a list of said vote data received from said each voter apparatus when said administrator signature is found valid and for publishing said list to a voter of said each voter apparatus in a manner to be accessible therefrom;

a decryptor for decrypting said information containing said encrypted vote content with a secret key corresponding to said public key to obtain the vote content of said voter;

counter means for counting the number of votes polled for each candidate on the basis of said decrypted vote content;

a plurality of distributed counter apparatuses, each placed under the control of a different counter, and wherein said secret key is split into partial secret keys assigned to said plurality of distributed counter apparatuses, respectively; said plurality of distributed counter apparatuses each have a partial decryption part for processing said encrypted vote content with said partial secret key assigned thereto to generate intermediate data and for sending said intermediate data to a predetermined one of said distributed counter apparatuses; and said predetermined distributed counter apparatus has a total decryption part for decrypting all of said intermediate data to obtain said vote content.

7. A recording medium having recorded thereon a program for executing, by a computer, a procedure of a counter apparatus in an electronic voting system which comprises a plurality of voter apparatuses, an administrator connected to each of said plurality of voter apparatuses through a nonanonymous communication channel, and said counter apparatus connected to said each vote apparatus through an anonymous communication channel, wherein said counter apparatus has a series connection of a plurality of distributed counter apparatuses, each placed under the control of a different counter, said secret key is split into partial secret keys assigned to said plurality of distributed counter apparatuses, respectively, said procedure comprising the steps of:

(a) receiving, as vote data, from each of said vote apparatuses information containing a vote content of each voter encrypted with a public key of said counter apparatus and an administrator signature for said information and verifying the validity of said administrator signature;

(b) generating, as a vote list, a list of said vote data received from said each voter apparatus, if said administrator is found valid, and publishing said vote list in the form accessible by said each voter;

(c) decrypting said information containing said encrypted vote content with a secret key corresponding to said public key to obtain the vote content of said each voter, receiving said vote data sent from said each voter apparatus by that one of said plurality of distributed counter apparatuses which is connected to one end of said series connection, and sequentially performing partial decryption processes of said information containing said encrypted vote content by said distributed counter apparatuses with said partial secret keys assigned thereto, respectively; and said vote content is obtained by said partial decryption process in said distributed counter apparatus at the last stage of said series connection; and (d) counting the number of votes polled for each candidate on the basis of said decrypted vote content.

8. A recording medium having recorded thereon a program for executing, by a computer, a procedure of a counter apparatus in an electronic voting system which comprises a plurality of voter apparatuses, an administrator connected to each of said plurality of voter apparatuses through a nonanonymous communication channel, and said counter apparatus connected to said each vote apparatus through an anonymous communication channel, wherein said counter apparatus has a plurality of distributed counter apparatuses, each placed under the control of a different counter, said secret key is split into partial secret keys which are assigned to said plurality of distributed counter apparatuses, respectively, said procedure comprising the steps of:

(a) receiving, as vote data, from each of said vote apparatuses information containing a vote content of each voter encrypted with a public key of said counter apparatus and an administrator signature for said information and verifying the validity of said administrator signature;

(b) generating, as a vote list, a list of said vote data received from said each voter apparatus, if said administrator is found valid, and publishing said vote list in the form accessible by said each voter;

(c) decrypting said information containing said encrypted vote content with a secret key corresponding to said public key to obtain the vote content of said each voter, receiving said vote data from all of said voter apparatuses by each of said plurality of distributed counter apparatuses, then process said encrypted vote content with said partial secret key assigned to said each distributed counter apparatus to generate intermediate data, then sending said intermediate data to said predetermined distributed counter apparatus, and performing, by said predetermined distributed counter apparatus, total decryption processing of all of said intermediate data sent thereto to thereby obtain said vote content; and (d) counting the number of votes polled for each candidate on the basis of said decrypted vote content.

9. The electronic voting method of claim 1 or 2, which comprises, prior to the step (d), the additional steps: (d-0) wherein said counter inputs said encrypted vote content and said administrator signature into a signature verification part to make sure that said preprocessed text is signed by said administrator, and publishes a list, of vote data containing encrypted vote contents; and (d-1) wherein said each voter makes sure that his encrypted vote content is placed on said list.

10. The electronic voting method of claim 2, wherein: said information randomizing step (a) comprises the additional steps wherein said each voter generates a tag that only he knows, and step wherein said each voter concatenates said encrypted vote content with said tag and randomizes it with said random number, and said step (d-1) comprises the additional step wherein said each voter separates said tag from said vote data on said list and makes a check to see if said tag is his.

11. The electronic voting method of claim 1 or 2, wherein: said step (b) comprises the additional step wherein said administrator publishes, as a list of voters, a list of information representing voters given said blind signature; and said step (c) comprises the additional step wherein said each voter makes a check to see if information representing him is contained in said list of voters.

12. The electronic voting method of claim 1 or 2, wherein said step (d) comprises the additional step wherein said counter publishes the result of counting of said vote content.

13. The electronic voting method of claim 1 or 2, wherein: in said step (a) said each voter sends said preprocessed text to said administrator apparatus together with voter identification information; in said step (b) said administrator verifies the validity of said each voter on the basis of said voter identification information; and in said step (c) said each voter sends said vote data anonymously to said counter apparatus.

14. The electronic voting method of claim 1 or 2, wherein: said step (a) comprises the additional step wherein said each voter generates his signature for said vote content, and sends said his signature to said administrator apparatus together with said vote content; and said step (b) comprises the additional step wherein said administrator apparatus verifies the validity of said voter signature for said vote content.

15. The electronic voting method of claim 1 or 2, wherein said decryption processing is a thresholding decryption processing that requires a predetermined plural number of said distributed counter apparatuses to work together.

16. The electronic voting system of claim 3 or 4, wherein: said each voter apparatus further comprises an administrator signature verification part for verifying the validity of said administrator signature for said information containing said encrypted vote content, and sends said vote data to said counter apparatus when said administrator signature is found valid; and said counter apparatus further comprises an administrator signature verification part into which said information containing said encrypted vote content in said vote data received from said each voter apparatus and said administrator signature are input for verifying the validity of said administrator signature.

17. The electronic voting system of claim 3 or 4, wherein: said each voter apparatus further comprises a voter signature generator for generating a voter signature for said preprocessed text and for sending it to said administrator apparatus; and said administrator apparatus further comprises a voter signature verification part for verifying the validity of said preprocessed text received from said each voter apparatus and said voter signature therefore, and generates said blind signature by said blind signature generator when said preprocessed text and said voter signature are found valid.

18. The electronic voting system of claim 3 or 4, wherein: said counter apparatus further comprises a vote list generator which, if said administrator signature is found valid, generates, as a vote list, a list of said vote data received from said each voter apparatus, and publishes said vote list to said voter in a manner to be accessible from said each voter apparatus; and said each voter apparatus further comprises a vote list checker for making a check to see if said encrypted vote content of said each voter apparatus is contained in said vote list received from said counter apparatus.

19. The electronic voting system of claim 18, wherein said each voter apparatus further comprises: a tag generator for generating a tag that only said voter knows; a concatenator for concatenating said encrypted vote content with said tag to generate information containing said encrypted vote content; and a list checking part for extracting said tag from each vote data in said vote list and for making a check to see if vote data of said voter is contained in said vote list by checking whether said extracted tag is the tag of said voter.

20. The electronic voting system of claim 3 or 4, wherein said decryption part performs thresholding decryption processing that requires a predetermined plural number of said distributed counter apparatuses to work together.

21. The counter apparatus of claim 5 or 6, wherein said partial decryption part performs thresholding decryption processing that requires a predetermined plural number of said distributed counter apparatuses to work together.

22. The recording medium of claim 7 or 8, wherein said step (e) is a step of performing thresholding partial decryption processing that requires a predetermined plural number of said distributed counter apparatuses to work together.

* * * * *

UNITED STATES PATENT AND TRADEMARK OFFICE
CERTIFICATE OF CORRECTION

PATENT NO. : 6,845,447 B1
DATED : January 18, 2005
INVENTOR(S) : Atsushi Fujioka et al.

It is certified that error appears in the above-identified patent and that said Letters Patent is hereby corrected as shown below:

Column 15,
Line 65, "sanding" should read -- sending --.

Signed and Sealed this

Fifth Day of April, 2005

JON W. DUDAS
*Director of the United States Patent and Trademark Office*